(12) United States Patent
Levy et al.

(10) Patent No.: US 8,818,278 B2
(45) Date of Patent: Aug. 26, 2014

(54) DEVICE, SYSTEM AND METHOD OF DISCOVERING WIRELESS COMMUNICATION DEVICES

(75) Inventors: Elad Levy, Nes Ziona (IL); Ofir Artstain, Netanya (IL); Solomon Trainin, Haifa (IL); Carlos Cordeiro, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 13/534,023

(22) Filed: Jun. 27, 2012

(65) Prior Publication Data

US 2013/0252548 A1 Sep. 26, 2013

Related U.S. Application Data

(60) Provisional application No. 61/614,069, filed on Mar. 22, 2012, provisional application No. 61/623,705, filed on Apr. 13, 2012.

(51) Int. Cl.
*H04B 7/00* (2006.01)

(52) U.S. Cl.
USPC .......................................... 455/41.2; 455/517

(58) Field of Classification Search
USPC ............ 455/434, 422.1, 448, 41.2, 517, 41.3; 370/329, 310, 328, 330
See application file for complete search history.

(56) References Cited

U.S. PATENT DOCUMENTS

| | | | |
|---|---|---|---|
| 8,275,373 B2 * | 9/2012 | Julian et al. | 455/434 |
| 8,547,920 B2 * | 10/2013 | Chen | 370/329 |
| 2008/0176561 A1 * | 7/2008 | Shao et al. | 455/434 |
| 2013/0343247 A1 | 12/2013 | Kasher | |

FOREIGN PATENT DOCUMENTS

| | | |
|---|---|---|
| WO | 2004/107784 A1 | 12/2004 |
| WO | 2009/116922 A1 | 9/2009 |

OTHER PUBLICATIONS

International Search Report and Written Opinion received for PCT Patent Application No. PCT/US2013/033384, mailed on Jun. 28, 2013, 9 pages.
Wireless-Gigabit-Alliance (WGA) specifications (Wireless Gigabit Alliance, Inc WiGig MAC and PHY Specification Version 1.0, Final specification), Apr. 2010.
IEEE 802.Nov. 2007, IEEE Standard for Information Technology—Telecommunications and information exchange between systems—Local and metropolitan area networks—Specific requirements, Part 11: Wireless LAN Medium Access Control (MAC) and Physical Layer (PHY) Specifications; Jun. 12, 2007.
Wi-Fi Alliance Technical Committee P2P Task Group. Wi-Fi Peer-to-Peer (P2P) Technical Specification. Version 1.2; 160 pages; Dec. 14, 2011.
Office Action for U.S. Appl. No. 13/527,611, mailed on Feb. 20, 2014, 22 pages.
Final Office Action for U.S. Appl. No. 13/527,611, mailed on May 30, 2014, 24 pages.

* cited by examiner

*Primary Examiner* — Sonny Trinh
(74) *Attorney, Agent, or Firm* — Shichrur & Co.

(57) ABSTRACT

Some demonstrative embodiments include devices, systems and/or methods of wireless communication discovery. For example, a first wireless communication device may include a wireless communication unit to discover a second wireless communication device according to an asymmetric discovery process, in which the wireless communication unit is to operate in only one first state selected from a searching state and a listening state, while the second wireless communication device is to operate in only one second state selected from the searching state and the listening state.

30 Claims, 5 Drawing Sheets

DEVICE, SYSTEM AND METHOD OF DISCOVERING WIRELESS COMMUNICATION DEVICES

CROSS REFERENCE

This application claims the benefit of and priority from U.S. Provisional Patent application No. 61/614,069, entitled "Asymmetric discovery techniques", filed Mar. 22, 2012, and from U.S. Provisional Patent application No. 61/623,705, entitled "Asymmetric discovery techniques", filed Apr. 13, 2012, the entire disclosures of both of which are incorporated herein by reference.

BACKGROUND

A mobile device, e.g., a laptop computer, a notebook computer, a tablet, or the like, may be able to connect to a docking station. The docking station may enable the mobile device to utilize one or more peripheral devices, e.g., a keyboard, a mouse, a display, speakers and the like, which may be connected to the docking station. For example, a user may utilize the docking station to connect to an external keyboard, mouse and/or display, when working on the mobile device.

The docking station may include a physical connector to enable connecting the mobile device. Accordingly, the docking station may be required to be compatible to a type and/or product of the mobile device, to enable the physical connection of the mobile device to the docking station, e.g., using a cable, a Universal Serial Bus (USB) connection, and/or any other physical connection.

A wireless docking station may be configured to enable a wireless connection of the mobile device to the wireless docking station. The wireless connection may enable the user to connect the mobile device to the peripheral devices without physically connecting the mobile device to the docking station.

Accordingly, the wireless docking station may provide a convenient and easy to use connection to the peripheral devices.

The mobile device and the wireless docking station may have to discover each other within a reasonable discovery time period, e.g., when the mobile device and the wireless docking station are within a discovery range, prior to establishing the wireless connection.

The mobile device and the wireless docking station may utilize a symmetric discovering process, in which the mobile device and the wireless docking station may periodically switch, in a symmetric manner, between performing an active scanning and a passive scanning to discover each other. The active scanning may include transmitting a message on a channel and the passive scanning may include listening to the channel and waiting to receive the message.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (*Wireless Gigabit Alliance, Inc WiGig MAC and PHY Specification Version 1.0, April* 2010, *Final specification*) and/or future versions and/or derivatives thereof, devices and/or networks operating in accordance with existing IEEE 802.11 standards (*IEEE 802.11-2007, IEEE Standard for Information Technology—Telecommunications and information exchange between systems—Local and metropolitan area networks—Specific requirements, Part* 11: *Wireless LAN Medium Access Control (MAC) and Physical Layer (PHY) Specifications; IEEE* 802.11*n*-2009, *IEEE Standard for Information Technology—Telecommunications and infor-* mation exchange between systems—Local and metropolitan area networks—Specific requirements, Part 11: Wireless LAN Medium Access Control (MAC) and Physical Layer (PHY) specifications, Amendment 5: Enhancements for Higher Throughput; IEEE802.11 task group ac (TGac) ("IEEE802.11-09/0308r12—TGac Channel Model Addendum Document"), IEEE 802.11 task group ad (TGad) (IEEE P802.11ad/D1.0 Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band), and/or future versions and/or derivatives thereof, devices and/or networks operating in accordance with existing IEEE 802.16 standards (IEEE-Std 802.16, 2009 Edition, Air Interface for Fixed Broadband Wireless Access Systems; IEEE-Std 802.16e, 2005 Edition, Physical and Medium Access Control Layers for Combined Fixed and Mobile Operation in Licensed Bands; amendment to IEEE Std 802.16-2009, developed by Task Group m) and/or future versions and/or derivatives thereof, devices and/or networks operating in accordance with existing Wireless-WirelessHD™ specifications and/or future versions and/or derivatives thereof, units and/or devices which are part of the above networks, one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee, Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. For example, the antenna may include at least one of a phased array antenna, a single element antenna, a set of switched beam antennas, and the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The term "association", as used herein may relate to a service used to establish access point/station (AP/STA) mapping. The association may enable, for example, STA invocation of distribution system services (DSSs).

The term "beamforming", as used herein, may relate to a spatial filtering mechanism, which may be used at a transmitter and/or a receiver to improve the received signal power or signal-to-noise ratio (SNR) at an intended receiver.

The phrases "directional band" (DBand), as used herein, may relate to a frequency band wherein the channel starting frequency is above 45 GHz.

The phrases "directional multi-gigabit" (DMG), as used herein, may relate to a frequency band wherein the operating channel center frequency is above 45 GHz.

The phrases "non-DBand", as used herein, may relate to a frequency band wherein the channel starting frequency is lesser than 45 GHz.

The phrase "DBand antenna", as used herein, may relate to a phased array, a single element antenna, or a set of switched beam antennas covered by a quasi-omni antenna pattern.

The phrase "quasi-omni antenna pattern", as used herein, may include a DBand antenna operating with a widest practical beamwidth attainable for a particular antenna.

The phrase "Ultra Band (UB)", as used herein, may relate to the frequency band of 57-66 GHz.

The phrase "mmWave STA (STA)", as used herein, may relate to a STA having a radio transmitter, which is operating on a channel that is within the UB.

The phrase "personal basic service set" (PBSS), as used herein, may relate to a basic service set (BSS) that forms a self-contained network. For example, the PBSS may operate in the DBand, and may include one PBSS control point (PCP).

The phrase "PBSS control point" (PCP), as used herein, may include an entity that contains one station (STA) and coordinates access to the WM by STAs that are members of a PBSS.

The phrase "non-PCP station (STA)", as used herein, may relate to a STA that is not also a PCP.

The phrase "non-PCP/non-AP station (STA)", as used herein, may relate to a STA that is not a PCP and that is not an AP.

The phrase "PCP/AP", as used herein, may relate to a STA that is a PCP or an AP.

The phrase "Beacon interval", as used herein, may relate to a number of time units (TUs) between target beacon transmission times (TBTTs).

The phrase "beacon transmission interval" (BTI), as used herein, may relate to a time interval between the start of a first beacon transmission by a STA in a beacon interval to an end of a last beacon transmission by the STA in the same beacon interval.

The phrase "association beamforming training" (A-BFT), as used herein, may relate to a time allocated for a STA, following the BTI, to respond to beacons transmitted during the BTI, e.g., using a sector sweep.

The phrase "contention-based access period" (CBAP), as used herein, may relate to a time period within a data transfer time (DTT) of a BSS where two or more STA are allowed to communicate according to a contention-based mechanism.

The phrase "service period" (SP), as used herein, may relate to a contiguous time during which one or more downlink individually addressed frames are transmitted to a quality of service (QoS) AP or PCP station, and/or one or more transmission opportunities (TXOPs) are granted to the same STA. SP's are either scheduled or unscheduled.

The phrase "Peer-to-peer" (P2P) network, as used herein, may relate to a network in which a STA in the network can operate as a client or as a server for another STA in the network. The P2P network may allow shared access to resources, e.g., without a need for a central server.

The term "sector", as used herein, may relate to a transmit and/or a receive antenna pattern corresponding to a particular sector, e.g., a sector identifier (ID).

The term "sweep", as used herein, may relate to a sequence of transmissions, e.g., separated by a short beamforming inter frame space (SBIFS) interval, in which an antenna configuration at a transmitter and/or a receiver is changed between transmissions.

The phrase "sector sweep" (SSW), as used herein, may relate to a reception or a transmission of frames via different sectors, in which a sweep is performed between consecutive receptions and/or transmissions.

The phrase "receive sector sweep" (RXSS), as used herein, may relate to a reception of frames via different sectors, in which a sweep is performed between consecutive receptions.

The phrase "transmit sector sweep" (TXSS), as used herein, may relate to transmission of multiple frames or DBand beacon frames via different sectors, in which a sweep is performed between consecutive transmissions.

The phrase "docking station", as used herein, may relate to an interface connected to one or more peripheral devices, e.g., a display, one or more speakers, a mouse, a keyboard and/or the like, configured to enable a device to connect to and communicate with the peripheral devices. For example, the docking station may be configured to enable a mobile device, e.g., a mobile computer, to connect to an external display and/or an external keyboard.

The phrases "power save" and "power save mode", as used herein, may refer, for example, to reducing, diminishing, shutting down, powering off, turning off and/or switching off the electrical current to a device and/or component, and/or to switching the device and/or component to operate at a sleep mode, a reduced-power mode, a stand-by mode, an idle mode and/or any other operation mode, which consumes less power than required for full and/or normal operation of the device and/or component, e.g., for full reception, handling, decoding, transmitting and/or processing of wireless communication signals.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments include a device including a wireless communication unit to discover a wireless communication device according to an asymmetric discovery process, in which the wireless communication unit is to operate in only one first state selected from a searching state and a listening state, while the wireless communication device is to operate in only one second state selected from the searching state and the listening state.

In some demonstrative embodiments, the first state may include the listening state.

In some demonstrative embodiments, the listening state may include waiting at an omni-directional receive state to receive a beacon from the wireless communication device.

In some demonstrative embodiments, the listening state may include waiting at the omni-directional receive state over a single predefined wireless communication channel.

In some demonstrative embodiments, the wireless communication unit may include a plurality of omni-directional antennas, and the listening state may include performing a sequence of scan cycles, each scan cycle including setting one of the plurality of antennas to the omni-directional receive state.

In some demonstrative embodiments, the device may include a docking station.

In some demonstrative embodiments, the first state may include the searching state.

In some demonstrative embodiments, the wireless communication unit is to perform a scan cycle including a sequence of active scan patterns over a plurality of wireless communication channels.

In some demonstrative embodiments, an active scan pattern over a wireless communication channel may include sending multiple beacons in multiple directions over the wireless communication channel, waiting for a predefined time period to receive a response from the wireless communication device, and switching to a power save mode.

In some demonstrative embodiments, the wireless communication unit may include a plurality of antennas, and wherein the wireless communication unit is to repeat the scan cycle for each antenna of the plurality of antennas.

In some demonstrative embodiments, the device may include a mobile device.

In some demonstrative embodiments, the wireless communication unit is to discover the wireless communication device within no more than a predefined discovery time period, if the wireless communication unit is within a transmission range of the wireless communication device, wherein the discovery time period is based on a combination of a beacon interval utilized by the searching state, a number of wireless communication channels utilized by the searching state, a number of antennas utilized by the wireless communication unit and a number of antennas utilized by the wireless communication device.

In some demonstrative embodiments, the wireless communication unit is to discover the wireless communication device over a millimeter-wave (mmwave) wireless communication band.

In some demonstrative embodiments, the wireless communication unit is to discover the wireless communication device for forming a peer-to-peer (P2P) communication link.

Some demonstrative embodiments include system including at least a first wireless communication device, which may include one or more antennas; and a wireless communication unit to discover a second wireless communication device according to an asymmetric discovery process, in which the first wireless communication device is to operate in only one first state selected from a searching state and a listening state, while the second wireless communication device is to operate in only one second state selected from the searching state and the listening state.

Some demonstrative embodiments include a method including discovering a wireless communication device according to an asymmetric discovery process by operating in only one first state selected from a searching state and a listening state, while the wireless communication device is to operate in only one second state selected from the searching state and the listening state.

Some demonstrative embodiments include a non-transitory product including a storage medium having stored thereon instructions that, when executed by a machine, result in discovering a wireless communication device according to an asymmetric discovery process by operating in only one first state selected from a searching state and a listening state, while the wireless communication device is to operate in only one second state selected from the searching state and the listening state.

Figure 1:
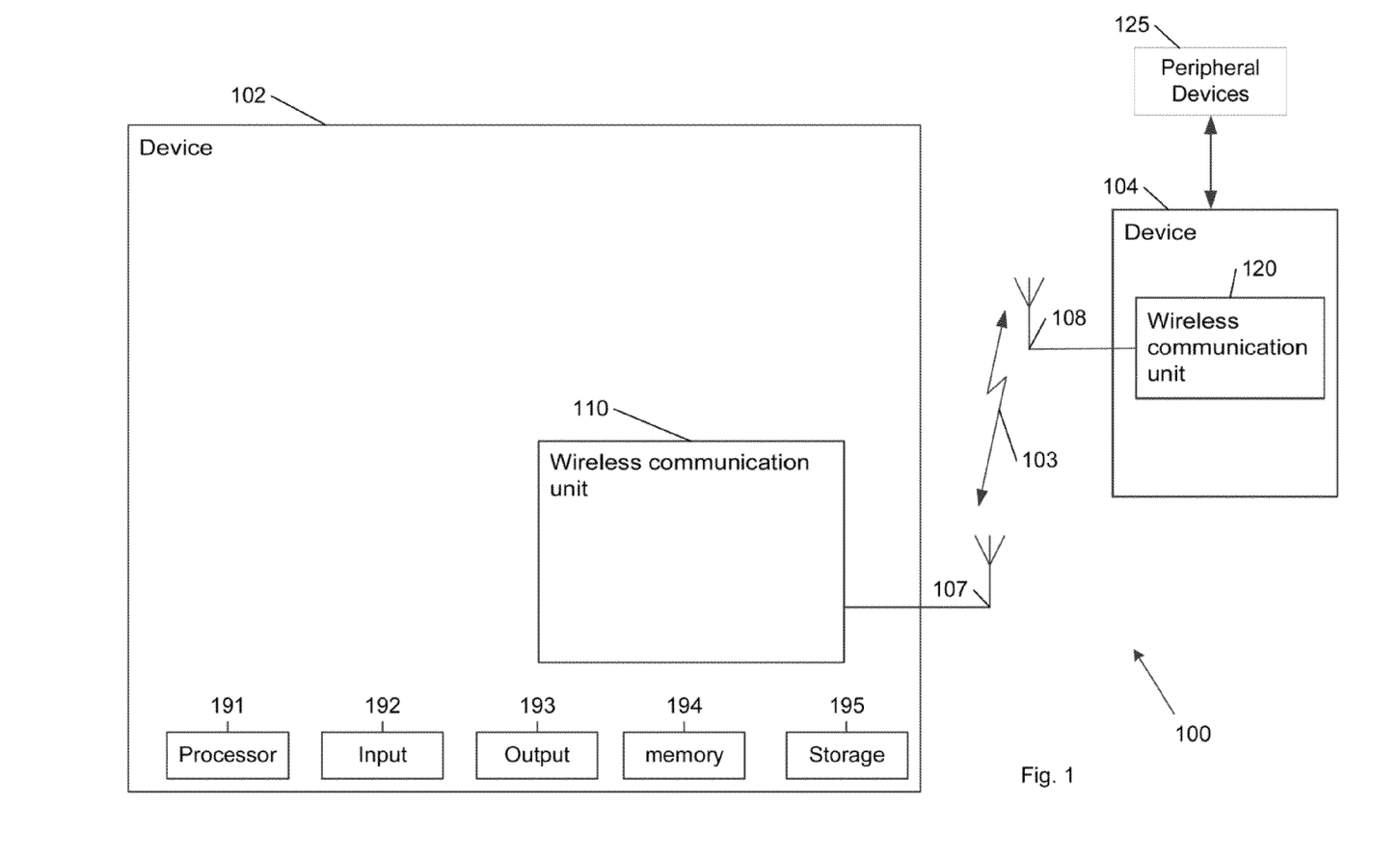
FIG. 1 is a schematic block diagram illustration of a system, in accordance with some demonstrative embodiments.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 104, capable of communicating content, data, information and/or signals over one or more suitable wireless communication links 103, for example, a radio channel, an IR channel, a RF channel, a Wireless Fidelity (WiFi) channel, and the like.

In some demonstrative embodiments, wireless communication devices 102 and/or 104 may include wireless communication units 110 and/or 120, respectively, to perform wireless communication between wireless communication devices 102 and/or 104, and/or with one or more other wireless communication devices, e.g., as described below.

In some demonstrative embodiments, wireless communication units 110 and/or 120 include, for example, one or more wireless transmitters, receivers and/or transceivers able to send and/or receive wireless communication signals, RF signals, frames, blocks, transmission streams, packets, messages, data items, and/or data. For example, wireless communication units 110 and/or 120 may include or may be implemented as part of a wireless Network Interface Card (NIC), and the like.

In some demonstrative embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. For example, antennas 107 and/or 108 may include at least one of a phased array antenna, a single element antenna, a set of switched beam antennas, and the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some demonstrative embodiments, device 102 may include, or may be included as part of a mobile or portable device, for example, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile phone, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 104 may include a non-mobile device. In other embodiments, device 104 may be implemented as a mobile device.

In some demonstrative embodiments, device 104 may include a passive device, e.g., a device, which does not initiate communication actions and, which waits for one or more communication actions initiated by other devices, e.g., device 102.

In one example, device 104 may include an AP, configured to enable device 102 to connect to one or more network resources.

In another example, device 104 may include a wireless docking station connected to one or more peripheral devices 125 and configured to enable device 102 to utilize peripheral devices 125 in a wireless manner. Peripheral devices 125 may include, for example, a keyboard, a mouse, one or more speakers, a display, a Universal Serial Bus (USB) hub, and/or the like.

In some demonstrative embodiments, device 102 may discover device 104 over a millimeter-wave (mmwave) wireless communication band, or any other communication band.

In some demonstrative embodiments, device 102 may discover device 104 to form a peer-to-peer (P2P) communication link, e.g., to receive access to one or more resources and/or services provided by device 104.

In some demonstrative embodiments, the discovery of device 104 may be performed within a reasonable discovery time period, e.g., when device 102 is within a transmission range of device 104. For example, device 102 may be required to discover device 104 within a predefined period, e.g., 5 seconds, for example, when device 102 is within a predefined transmission range, e.g., less than 5 meters, from device 104.

In some demonstrative embodiments, discovering device 104 by periodically switching devices 102 and 104 between operating in a listening state and a searching state, e.g., in a symmetric manner, may require device 102 to wait in an omni-directional receive state, e.g., while operating in the listening state, until device 102 receives a beacon transmitted from device 104.

In some demonstrative embodiments, device 102 may wait to receive the beacon in the omni-directional receive state for a relatively long period of time, e.g., at least as long as device 104 is out of the transmission range from device 102.

In some demonstrative embodiments, device 102 may consume a relatively large amount of power when operating at the listening state, e.g., while waiting in the omni-directional receive state.

In some demonstrative embodiments, device 102 may be power constrained having a limited power source. For example, device 102 may consume less power, e.g., compared to device 104. For example, device 102 may be required to consume up to a predefined amount of power, e.g., less than 3 milliWatt (mw), when operating at an idle state. Device 104 may not be power constrained, e.g., having an unlimited power source. For example, device 102 may include a mobile computer, e.g., a laptop, having a rechargeable battery, and device 104 may be connected to a power supply.

In some demonstrative embodiments, device 102 may be configured to operate only in the searching state when attempting to discover device 104, e.g., to reduce a power consumption of device 102, as described in detail below.

In some demonstrative embodiments, a first device of devices 102 and 104 may discover a second device of devices 102 and 104, according to an asymmetric discovery process, in which the first device is to operate in only one first state selected from a searching state and a listening state, while the second device is to operate in only one second, different, state selected from the searching state and the listening state, e.g., as described below.

In some demonstrative embodiments, device 102 may discover device 104 according to the asymmetric discovery process, in which device 102 is to operate in the searching state, while device 104 is to operate in the listening state, e.g., as described below.

In some demonstrative embodiments, when operating in the searching state, device 102 may perform a scan cycle including a sequence of active scan patterns over a plurality of wireless communication channels.

In some demonstrative embodiments, an active scan pattern over a wireless communication channel may include sending one or more beacons over the wireless communication channel, waiting for a predefined time period to receive a response from device 104, and switching to a power save mode.

In some demonstrative embodiments, when operating in the listening state, device 104 may wait over a single predefined wireless communication channel to receive a beacon of the one or more beacons transmitted from device 102.

In some demonstrative embodiments, device 104 may receive the beacon, e.g., via antennas 108, and may transmit a response, e.g., in response to the received beacon. In some demonstrative embodiments, device 102 may receive the response and may complete the discovery process.

In some demonstrative embodiments, device 102 may discover device 104 according to the asymmetric discovery process over at least one predefined frequency band, e.g., as described below.

In some demonstrative embodiments, device 102 may discover device 104 according to the asymmetric discovery process over a DBand, for example, a 60 GHz frequency band, e.g., as described below.

In some demonstrative embodiments, when operating in the searching state, device 102 may perform a scan cycle including a sequence of active scan patterns over one or more DBand channels of the DBand. For example, device 102 may perform an active scan pattern over one or more social channels defined for the DBand.

In some demonstrative embodiments, device 102 may perform the active scan pattern over a DBand channel by sending multiple beacons in multiple directions over the DBand channel. For example, device 102 may send the multiple beacons utilizing a transmit sector sweep for a predefined period of time of a beacon interval, e.g., a time period of a BTI, as described below with reference to FIG. 2.

In some demonstrative embodiments, device 102 may perform the active scan pattern by waiting for a predefined time period of the beacon interval to receive a response from device 104. For example, wireless communication unit 110 may switch to an omni-directional receive mode for the predefined time period, e.g., an A-BFT period. For example, wireless communication unit 110 may control antennas 107 to operate in a quasi-omni antenna pattern for the A-BFT period.

In some demonstrative embodiments, device 102 may perform the active scan pattern by switching to a power save mode for a remaining time period of the beacon interval, if the response is not received. For example, device 102 may switch to the power save mode, for example, after the time period of the BTI and the A-BFT.

In some demonstrative embodiments, device 102 may perform the scan cycle including performing the active scan pattern over another DBand channel of the DBand channels, e.g., if the response is not received from device 104. For example, device 102 may perform the active scan pattern at the beginning of each beacon interval, e.g., after device 102 wakes up from the power save mode, over a different DBand channel of the DBand channels, e.g., until receiving the response from device 104.

In some demonstrative embodiments, device 102 may include a plurality of antennas 107. Device 102 may repeat the scan cycle for each antenna of the plurality of antennas 107. For example, antennas 107 may include an array of two antennas. Device 102 may repeat the scan cycle for each antenna of the two antennas of antennas 107, e.g., if device 102 did not receive the response from device 104.

In some demonstrative embodiments, when operating in the listening state, device 104 may wait in an omni-directional receive state to receive a beacon of the multiple beacons transmitted from device 102. For example, wireless communication unit 120 may operate at the omni-directional receive state, e.g., by controlling antennas 108 to operate in a quasi-omni antenna pattern, until device 104 receives the beacon from device 102.

In some demonstrative embodiments, device 104 may wait over a single predefined wireless communication channel to receive the beacon from device 102. For example, wireless communication unit 120 may wait at the omni-directional receive state on a selected one of available DBand channels, e.g., a social channel defined for the DBand.

In some demonstrative embodiments, the single predefined wireless communication channel may be selected by device 104 according to an interference reduction algorithm. For example, device 104 may switch between the channels based on an interference level.

In some demonstrative embodiments, antennas 108 may include a plurality of omni-directional antennas. Device 104 may perform a sequence of scan cycles, e.g., each scan cycle corresponding to a different omni-directional antenna of antennas 108. For example, antennas 108 may include two omni-directional antennas, e.g., first and second omni-directional antennas. Device 104 may perform two scan cycles, e.g., a first scan cycle for the first omni-directional antenna, and a second scan cycle for the second omni-directional antenna.

In some demonstrative embodiments, a scan cycle of the sequence of scan cycles may include setting one of the plurality of antennas 108 to the omni-directional receive state. For example, a scan cycle over the first omni-directional antenna may include setting the first omni-directional antenna to the omni-directional receive state. For example, wireless communication unit 120 may set the first omni-directional antenna to the omni-directional receive state, e.g., by controlling the first omni-directional antenna to operate in a quasi-omni antenna pattern using a receive sector sweep.

In some demonstrative embodiments, device 104 may receive, e.g., via antennas 108, a beacon of the multiple beacons transmitted from device 102, and may transmit a response, e.g., in response to the received beacon. For example, device 104 may transmit the response using a transmit sector sweep during a predefined period of time of a beacon interval, e.g., during the A-BFT.

In some demonstrative embodiments, device 102 may receive the response, may transmit a feedback message to device 104, and may complete the discovery process.

In some demonstrative embodiments, device 102 may discover device 104 according to the asymmetric discovery process over another, e.g., different, frequency band. For example, device 102 may discover device 104 over a non-DBand frequency band, for example, a frequency band of 2.4 GHz and/or 5 GHz, e.g., as described in detail below.

In some demonstrative embodiments, when operating in the searching state, device 102 may perform an active scan pattern over one or more non-DBand wireless communication channels of the non-DBand frequency band. For example, device 102 may perform an active scan pattern over one or more, e.g., three, social channels defined for the non-DBand frequency band.

In some demonstrative embodiments, device 102 may perform the active scan pattern over the non-DBand wireless communication channel by transmitting a probe request over the non-DBand wireless communication channel, waiting for a predefined time period to receive a probe response from device 104, and switching to a power save mode.

In some demonstrative embodiments, when operating in the listening state, device 104 may wait over a single predefined non-DBand wireless communication channel to receive a probe request from device 102.

In some demonstrative embodiments, device 104 may receive, e.g., via antennas 108, the probe request from device 102, and may transmit a probe response, e.g., in response to the probe request. In some demonstrative embodiments, device 102 may receive the probe response and may complete the discovery of device 104.

In some demonstrative embodiments, device 102 may discover device 104 according to the asymmetric discovery process over two or more predefined bands, for example, the DBand and the non-DBand, e.g., as described below with reference to FIG. 3.

In some demonstrative embodiments, a scan cycle time period of the scan cycle performed by device 102 may be based on a combination of the beacon interval utilized by the searching state, a number of wireless communication channels utilized by the searching state, and a number of antennas utilized by wireless communication unit 110. For example, the scan cycle time period may be based on a product of the beacon interval, a number of the plurality of wireless communication channels, and a number of antennas 107.

In some demonstrative embodiments, device 102 may discover device 102 within no more than a predefined discovery time period, e.g., if device 104 is within a transmission range of device 102.

In some demonstrative embodiments, the discovery time period may be based on a combination of the beacon interval utilized by the searching state, the number of wireless communication channels utilized by the searching state, the number of antennas utilized by wireless communication unit 110 and the number of antennas utilized by device 104. For example, the discovery time period may be based on a product of the beacon interval, a number of the plurality of wireless communication channels of wireless communication links 103, a number of antennas 107, and a number of antennas 108, e.g., as described below with reference to FIG. 2.

In some demonstrative embodiments, the discovery time period may be reduced, e.g., minimized, for example, by minimizing the number of the wireless communication channels, in which the asymmetric discovery process is performed. For example, the asymmetric discovery process may be performed only over social channels defined for the DBand and/or the non-DBand, e.g., 3 social channels defined for the non-DBand, and one social channel defined for the DBand.

In some demonstrative embodiments, operating in the searching state during the discovery process may enable improving a power consumption of device 102, e.g., by utilizing the power save mode in the searching state, and by minimizing the discovery time period.

In some demonstrative embodiments, devices 104 and 102 may utilize another asymmetric discovery process, e.g., in addition to or instead of the discovery process described above. In one example, device 102 may operate at the listening state, while device 104 may operate at the searching state. For example, device 104 may transmit beacons at a relatively high periodicity, while device 102 may wait at the omni-directional receive state for a relatively short period of time. While this technique may present greater Over The Air (OTA) activity and interference to other devices utilizing the same channel, it may advantageously provide effective device discovery.

Wireless communication devices 102 and/or 104 may also include, for example, one or more of a processor 191, an input unit 192, an output unit 193, a memory unit 194, and a storage unit 195. Wireless communication devices 102 and/or 104 may optionally include other suitable hardware components and/or software components. In some demonstrative embodiments, some or all of the components of one or more of wireless communication devices 102 and/or 104 may be enclosed in a common housing or packaging, and may be interconnected or operably associated using one or more wired or wireless links. In other embodiments, components of one or more of wireless communication devices 102 and/or 104 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of wireless communication device 102, and/or of one or more suitable applications.

Input unit 192 includes, for example, a keyboard, a keypad, a mouse, a touch-pad, a track-ball, a stylus, a microphone, or other suitable pointing device or input device. Output unit 193 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by wireless communication devices 102 and/or 104.

Figure 2:
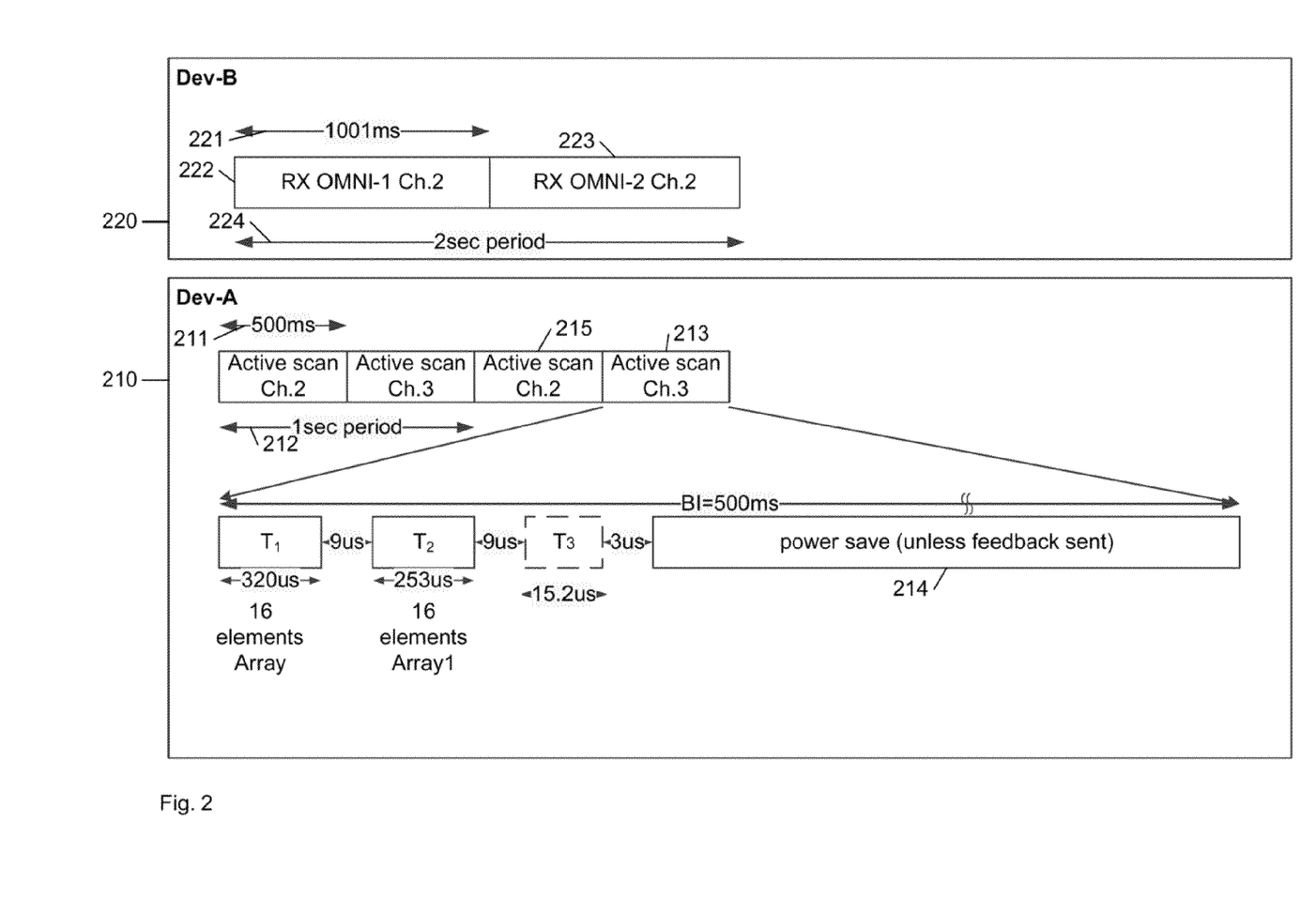
FIG. 2 is a schematic illustration of a passive scan scheme performed by a first wireless communication device, and an active scan scheme performed by a second wireless communication device, in accordance with some demonstrative embodiments.

Reference is now made to FIG. 2, which schematically illustrates an active scan scheme 210 performed by a first wireless communication device (Dev-A) operating in a searching state, and a passive scan scheme 220 performed by a second wireless communication device (Dev-B) operating in a listening state, in accordance with some demonstrative embodiments. For example, the first and second wireless communication devices may perform the functionality of devices 102 and 104 (FIG. 1), respectively.

In some demonstrative embodiments, the first wireless communication device may include a single antenna array, and the second wireless communication device may include two antenna arrays, e.g., a first antenna array and a second antenna array. For example, the single antenna array may perform the functionality of antennas 107, and the two antenna arrays may perform the functionality of antennas 108.

As shown in FIG. 2, the first wireless communication device may perform an active scan pattern over two predefined wireless communication channels, e.g., selected from four available channels of the DBand, during a beacon interval 211, e.g., of 500 milliseconds (ms). For example, the first wireless communication device may perform an active scan pattern 215 over a first channel (Ch.2), and an active scan pattern 213 over a second channel (Ch.3).

As shown in FIG. 2, a scan cycle time period 212 of the first wireless communication device may be one second (sec). For example, the duration of the scan cycle may be calculated according to a product of beacon interval 211, e.g., 500 ms, the number of the predefined communication channels, e.g., two, and the number of antenna arrays of the first wireless communication device, e.g., one array.

As shown in FIG. 2, active scan pattern 213 may include a first time period ($T_1$), e.g., a BTI, a second time period ($T_2$), e.g., an A-BFT, a third, e.g., optional, time period ($T_3$), and a remaining time period 214, e.g., a power save mode time period.

In some demonstrative embodiments, the first wireless communication device may transmit 16 DBand beacons in multiple directions utilizing a transmit sector sweep during the first time period $T_1$, wait at an omni-directional receive state to receive a beacon response from the second wireless communication device during the second time period $T_2$, and switch to the power save mode during time period 214, e.g., if the beacon response from the second wireless communication device may not received during the second time period.

In some demonstrative embodiments, the second wireless communication device may transmit 16 DBand beacon responses in multiple directions utilizing a transmit sector sweep during the second time period $T_2$, e.g., in response to a received beacon of the 16 DBand beacons transmitted from the first wireless communication device. The first wireless communication device may receive a beacon response of the 16 DBand beacon responses, and the first wireless communication device may transmit a feedback message in the third time period $T_3$.

As shown in FIG. 2, the second wireless communication device may wait at an omni-directional receive state over a single predefined wireless communication channel, e.g., the first channel (Ch.2). The second wireless communication device may wait at an omni-directional receive state 222 over the first channel (Ch.2) on the first antenna array for a time period 221, e.g., 1001 ms. The second wireless communication device may switch to wait on the second antenna array over the first channel (Ch.2) at an omni-directional receive state 223, for another time period 221, e.g., 1001 ms.

As shown in FIG. 2, a discovery time period 224 may be determined based on the product of a duration of active scan pattern 213, e.g., one second, and a number of antenna arrays of the second wireless communication device, e.g., two antenna arrays. For example, discovery time period 224 may last up to 2 seconds.

Figure 3:
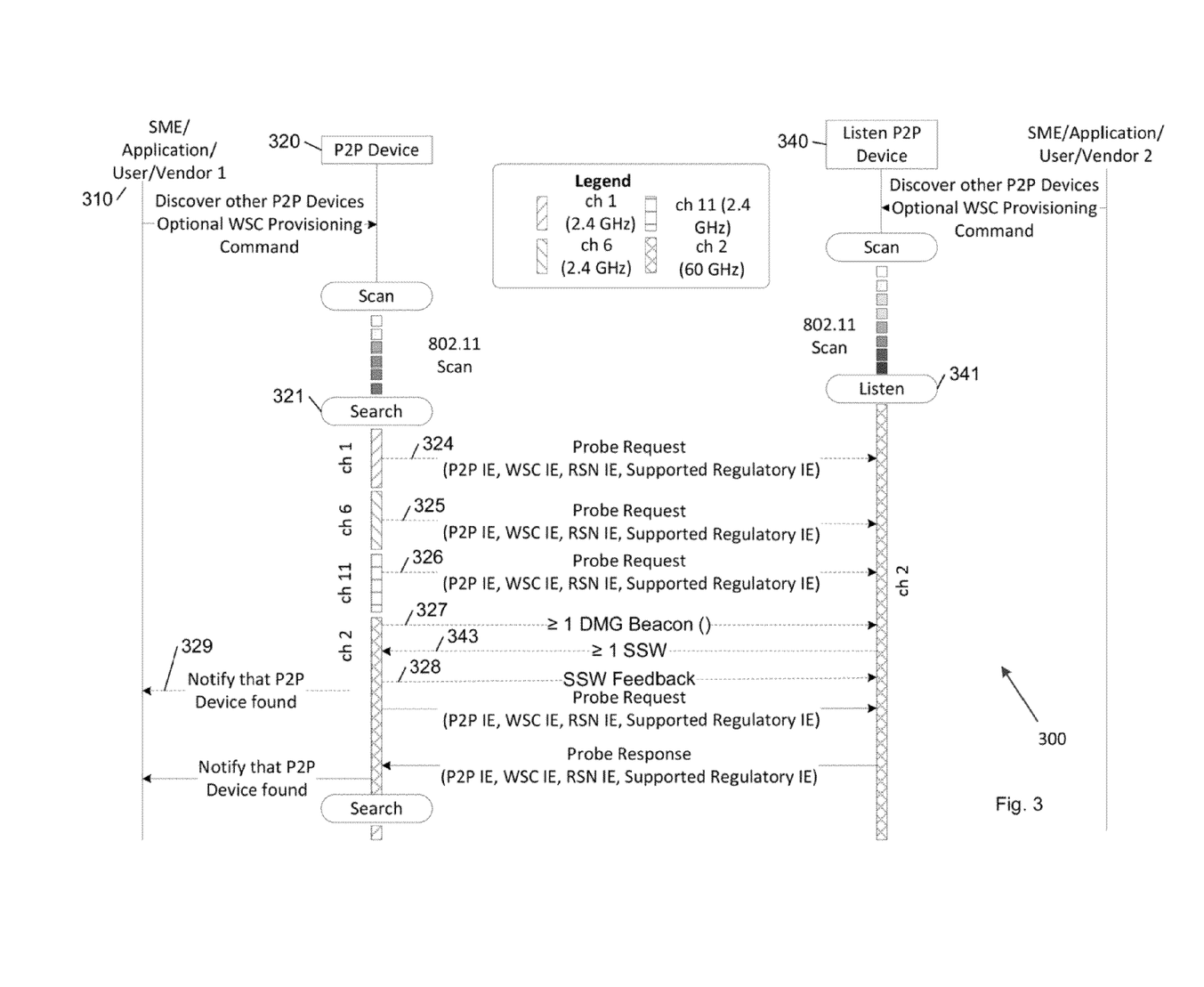
FIG. 3 is a schematic sequence diagram of operations and interactions between two wireless communication devices during a discovery process, in accordance with some demonstrative embodiments.

Reference is now made to FIG. 3, which schematically illustrates a sequence diagram 300 of operations and interactions between a first wireless communication device 340 ("P2P Device"), operating in a searching state 321, and a second wireless communication device 340 ("Listen P2P Device"), operating in a listening state 341, in accordance with some demonstrative embodiments. For example, wireless communication devices 320 and 340 may perform the functionality of devices 102 and 104 (FIG. 1), respectively.

As shown in FIG. 3, device 320 may perform an active scan pattern over four predefined channels. For example, device 320 may perform the active scan pattern over three social channels defined for the non-DBand, e.g., 2.4 GHz, and over a single social channel defined for the DBand, e.g., 60 GHZ. For example, the three social channels defined for the non-DBand may include channel 1 (ch 1), channel 6 (ch 6) and channel 11 (ch 11), and the single social channel defined for the DBand may include channel 2 (ch 2).

As shown in FIG. 3, device 340 may wait at an onmi-directional receive state over channel 2 to receive a beacon from device 320.

As shown in FIG. 3, device 320 may transmit a probe request over each social channel of the three social channels of the 2.4 GHz band. For example, device 320 may transmit a probe request 324 over channel 1, a probe request 325 over channel 6, and a probe request 326 over channel 11.

As shown in FIG. 3, device 320 may transmit a plurality of beacons 327 in a plurality of directions over channel 2 of the DBand, e.g., if device 320 did not receive any probe response, e.g., in response to probe requests 324, 325 and 326.

As shown in FIG. 3, device 340 may transmit a response 343 to device 320 utilizing a transmit sector sweep (SSW), e.g., in response to beacons 327.

As shown in FIG. 3, device 340 may transmit a feedback 328 to device 340, e.g., upon receiving a beacon of beacons 327. Device 320 may discover device 340 and may notify (329) an application 310 that device 340 is discovered.

Figure 4:
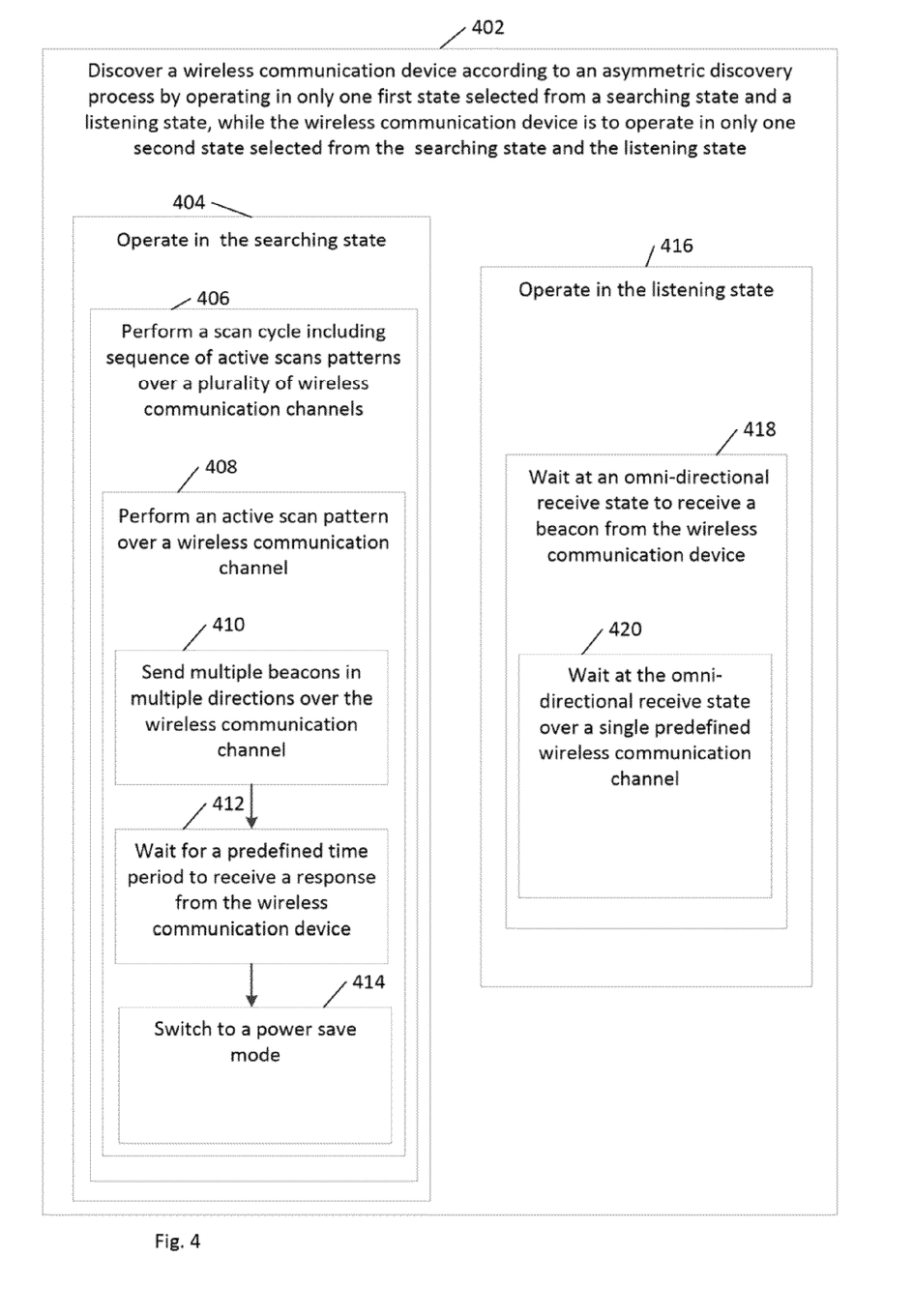
FIG. 4 is a schematic illustration of a method of asymmetric discovery, in accordance with some demonstrative embodiments.

Reference is made to FIG. 4, which schematically illustrates a method of asymmetric discovery of wireless communication devices, in accordance with some demonstrative embodiments. In some demonstrative embodiments, one or more of the operations of the method of FIG. 4 may be performed by any suitable wireless communication system, e.g., system 100 (FIG. 1); wireless communication device, e.g., devices 102 and/or 104 (FIG. 1); and/or wireless communication unit, e.g., wireless communication units 110 and/or 120 (FIG. 1).

As indicated at block 402, the method may include discovering a wireless communication device according to an asymmetric discovery process by operating in only one first state selected from a searching state and a listening state, while the wireless communication device is to operate in only one second, different, state selected from the searching state and the listening state. For example, device 102 (FIG. 1) may discover device 104 (FIG. 1) according to an asymmetric discovery process by operating in a searching state, while device 104 (FIG. 1) operates in a listening state, e.g., as described above.

As indicated at block 404, the method may include operating in the searching state. For example, device 102 (FIG. 1) may operate in the searching state, e.g., as described above.

As indicated at block 406, operating in the searching state may include performing a scan cycle including a sequence of active scan patterns over a plurality of wireless communication channels. For example, device 102 (FIG. 1) may perform a scan cycle including a sequence of active scan patterns over a plurality of wireless communication channels, e.g., as described above.

As indicated at block 408, performing the scan cycle may include performing an active scan pattern over a wireless communication channel. For example, device 102 (FIG. 1) may perform an active scan pattern over a DBand wireless communication channel, e.g., as described above.

As indicated at block 410, performing the active scan pattern may include sending multiple beacons in multiple directions over the wireless communication channel. For example, device 102 (FIG. 1) may send multiple beacons in multiple directions utilizing a transmit sector sweep over the DBand wireless communication channel during a BTI, e.g., as described above.

As indicated at block 412, performing the active scan pattern may include waiting for a predefined time period to receive a response from the wireless communication device. For example, device 102 (FIG. 1) may wait during an A-BFT to receive a response from device 104 (FIG. 1), e.g., as described above.

As indicated at block 414, performing the active scan pattern may include switching to a power save mode. For example, device 102 (FIG. 1) may switch to a power save mode after the A-BFT, e.g., as described above.

As indicated at block 416, the method may include operating in the listening state. For example, device 104 (FIG. 1) may operate in the listening state, e.g., as described above.

As indicated at block 418, operating in the listening state may include waiting at an omni-directional receive state to receive a beacon from the wireless communication device. For example, device 104 (FIG. 1) may wait at an omni-directional receive state to receive a beacon from device 102 (FIG. 1), e.g., as described above.

As indicated at block 420, waiting at the omni-directional receive state may include waiting at the omni-directional receive state over a single predefined wireless communication channel. For example, device 104 (FIG. 1) may wait at the omni-directional receive state over a social channel defined for the DBand, e.g., as described above.

Figure 5:
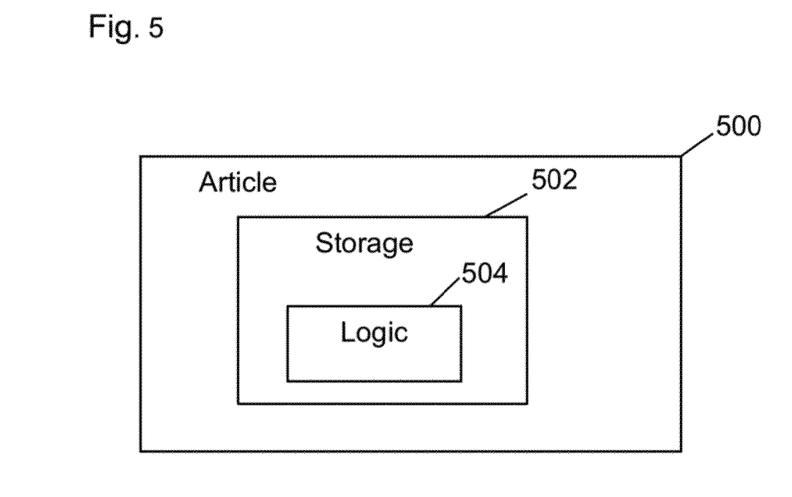
FIG. 5 is a schematic illustration of an article of manufacture, in accordance with some demonstrative embodiments.

Reference is made to FIG. 5, which schematically illustrates an article of manufacture 400, in accordance with some demonstrative embodiments. Article 500 may include a non-transitory machine-readable storage medium 502 to store logic 504, which may be used, for example, to perform at least part of the functionality of wireless communication unit 110 (FIG. 1), wireless communication device 102 (FIG. 1), wireless communication unit 120 (FIG. 1) and/or wireless communication device 104 (FIG. 1); and/or to perform one or more operations of the methods of FIG. 4. The phrase "non-transitory machine-readable medium" is directed to include all computer-readable media, with the sole exception being a transitory propagating signal.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:
a wireless communication unit to discover a wireless communication device according to an asymmetric discovery process, in which the wireless communication unit is to operate in only a listening state, while the wireless communication device is to operate in only a searching state, the listening state comprising waiting at an omni-directional receive state over a single predefined wireless communication channel to receive a beacon from the wireless communication device.

2. The device of claim 1 comprising a docking station.

3. The device of claim 1, wherein said wireless communication unit is to discover said wireless communication device over a millimeter-wave (mmwave) wireless communication band.

4. The device of claim 1, wherein said wireless communication unit is to discover said wireless communication device to form a peer-to-peer (P2P) communication link.

5. A device comprising:
a wireless communication unit to discover a wireless communication device according to an asymmetric discovery process, in which the wireless communication unit is to operate in only a listening state, while the wireless communication device is to operate in only a searching state, wherein said listening state comprises performing a sequence of scan cycles, each scan cycle including setting one of a plurality of omni-directional antennas to an omni-directional receive state to receive a beacon from the wireless communication device.

6. The device of claim 5 comprising a docking station.

7. A device comprising:
a wireless communication unit to discover a wireless communication device according to an asymmetric discovery process, in which the wireless communication unit is to operate in only a searching state, while the wireless communication device is to operate in only a listening state, said wireless communication unit to perform a scan cycle including a sequence of active scan patterns over a plurality of wireless communication channels, wherein an active scan pattern over a wireless communication channel comprises sending multiple beacons in multiple directions over said wireless communication channel, waiting for a predefined time period to receive a response from said wireless communication device, and switching to a power save mode.

8. The device of claim 7, wherein said wireless communication unit is to discover said wireless communication device over a millimeter-wave (mmwave) wireless communication band.

9. The device of claim 7, wherein said wireless communication unit is to discover said wireless communication device to form a peer-to-peer (P2P) communication link.

10. The device of claim 7, wherein said wireless communication unit is to repeat said scan cycle for each antenna of a plurality of antennas.

11. The device of claim 7 comprising a mobile device.

12. A device comprising:
a wireless communication unit to discover a wireless communication device according to an asymmetric discovery process, in which the wireless communication unit is to operate in only one first state selected from the group consisting of a searching state and a listening state, while the wireless communication device is to operate in only one second state selected from the group consisting of the searching state and the listening state, wherein said wireless communication unit is to discover said wireless communication device within no more than a predefined discovery time period, if said wireless communication unit is within a transmission range of said wireless communication device, wherein said discovery time period is based on a combination of a beacon interval utilized by said searching state, a number of wireless communication channels utilized by said searching state, a number of antennas utilized by the wireless communication unit, and a number of antennas utilized by the wireless communication device.

13. The device of claim 12, wherein said wireless communication unit is to discover said wireless communication device over a millimeter-wave (mmwave) wireless communication band.

14. The device of claim 12, wherein said wireless communication unit is to discover said wireless communication device for forming a peer-to-peer (P2P) communication link.

15. A system comprising:
a first wireless communication device comprising:
a plurality of antennas; and
a wireless communication unit to discover a second wireless communication device according to an asymmetric discovery process, in which the first wireless communication device is to operate in only a listening state, while the second wireless communication device is to operate in only a searching state, said wireless communication unit to perform a sequence of scan cycles, each scan cycle including setting an antenna of said plurality of antennas to an omni-directional receive state to receive a beacon from the second wireless communication device.

16. The system of claim 15, wherein said wireless communication unit is to discover said second wireless communication device over a millimeter-wave (mmwave) wireless communication band.

17. The system of claim 15, wherein said wireless communication unit is to discover said second wireless communication device to form a peer-to-peer (P2P) communication link.

18. The system of claim 15, wherein said first wireless communication device comprises a docking station.

19. A system comprising:
a first wireless communication device comprising:
one or more antennas; and
a wireless communication unit to discover a second wireless communication device according to an asymmetric discovery process, in which the first wireless communication device is to operate in only a searching state, while the second wireless communication device is to operate in only a listening state, said wireless communication unit is to perform a scan cycle including a sequence of active scan patterns over a plurality of wireless communication channels, wherein an active scan pattern over a wireless communication channel comprises sending multiple beacons in multiple directions over said wireless communication channel, waiting for a predefined time period to receive a response from said second wireless communication device, and switching to a power save mode.

20. The system of claim 19, wherein said wireless communication unit is to discover said second wireless communication device to form a peer-to-peer (P2P) communication link.

21. The system of claim 19, wherein said wireless communication unit is to discover said second wireless communication device within no more than a predefined discovery time period, if said wireless communication unit is within a transmission range of said second wireless communication device, wherein said discovery time period is based on a combination of a beacon interval utilized by said searching state, a number of wireless communication channels utilized by said searching state, and a number of said one or more antennas.

22. The system of claim 19, wherein said first wireless communication device comprises a mobile device.

23. The system of claim 19, wherein said wireless communication unit is to discover said second wireless communication device over a millimeter-wave (mmwave) wireless communication band.

24. A method comprising:
discovering a wireless communication device according to an asymmetric discovery process by operating in only a listening state, while the wireless communication device is to operate in only a searching state, wherein said listening state comprises performing a sequence of scan cycles, each scan cycle including setting one of a plurality of omni-directional antennas to an omni-directional receive state to receive a beacon from the wireless communication device.

25. The method of claim 24 comprising discovering said wireless communication device over a millimeter-wave (mmwave) wireless communication band.

26. The method of claim 24, comprising discovering said wireless communication device to form a peer-to-peer (P2P) communication link.

27. The method of claim 24 comprising discovering said wireless communication device within no more than a predefined discovery time period, if being within a transmission range of said wireless communication device, wherein said discovery time period is based on a combination of a beacon interval utilized by said searching state, a number of wireless communication channels utilized by said searching state, and a number of said plurality of omni-directional antennas.

28. A product including a non-transitory storage medium having stored thereon instructions that, when executed by a machine, result in:
discovering a wireless communication device according to an asymmetric discovery process by operating in only a searching state, while the wireless communication device is to operate in only a listening state, wherein operating in said searching state comprises performing a scan cycle including a sequence of active scan patterns over a plurality of wireless communication channels, wherein an active scan pattern over a wireless communication channel comprises sending multiple beacons in multiple directions over said wireless communication channel, waiting for a predefined time period to receive a response from said wireless communication device, and switching to a power save mode.

29. The product of claim 28, wherein said instructions result in repeating said scan cycle for each antenna of a plurality of antennas.

30. The product of claim 28, wherein said instructions result in discovering said wireless communication device over a millimeter-wave (mmwave) wireless communication band.

* * * * *

UNITED STATES PATENT AND TRADEMARK OFFICE
CERTIFICATE OF CORRECTION

| | |
|---|---|
| PATENT NO. | : 8,818,278 B2 |
| APPLICATION NO. | : 13/534023 |
| DATED | : August 26, 2014 |
| INVENTOR(S) | : Elad Levy et al. |

It is certified that error appears in the above-identified patent and that said Letters Patent is hereby corrected as shown below:

In The Claims

In column 20, line 8, in claim 26, delete "24," and insert -- 24 --, therefor.

Signed and Sealed this
Seventeenth Day of February, 2015

Michelle K. Lee
*Deputy Director of the United States Patent and Trademark Office*